United States Patent
Goetz

(10) Patent No.: US 7,267,274 B2
(45) Date of Patent: Sep. 11, 2007

(54) MAGNETIC INK VALIDATION FOR COUPON AND GAMING INDUSTRIES

(75) Inventor: Ronald J. Goetz, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 273 days.

(21) Appl. No.: 11/093,908

(22) Filed: Mar. 30, 2005

(65) Prior Publication Data

US 2006/0102721 A1    May 18, 2006

(51) Int. Cl.
*G06K 7/08* (2006.01)
*G06K 7/00* (2006.01)
*G06K 7/10* (2006.01)
*G01R 33/12* (2006.01)

(52) U.S. Cl. .................... 235/449; 235/435; 235/454; 235/462.01; 235/462.25; 324/213

(58) Field of Classification Search ................ 235/435, 235/449, 454, 462.01, 462.25; 324/213
See application file for complete search history.

(56) References Cited

U.S. PATENT DOCUMENTS

| | | | |
|---|---|---|---|
| 4,504,357 A | 3/1985 | Holbein et al. | |
| 4,574,190 A | 3/1986 | Nishimura | |
| 4,584,529 A | 4/1986 | Aoyama | |
| 5,014,325 A | 5/1991 | Moritomo | |
| 5,450,051 A * | 9/1995 | Stromberg | 235/384 |
| 5,964,158 A | 10/1999 | Takahashi | 101/484 |
| 6,243,504 B1 | 6/2001 | Kruppa | 382/318 |
| 6,545,466 B2 | 4/2003 | Sawa et al. | 324/212 |
| 6,659,347 B1 | 12/2003 | Moore et al. | 235/449 |
| 6,717,403 B2 | 4/2004 | Witcraft et al. | 324/252 |
| 6,731,111 B2 | 5/2004 | Sawa et al. | 324/260 |
| 2004/0217170 A1 | 11/2004 | Takiguchi et al. | 235/449 |
| 2005/0047641 A1 | 3/2005 | Volpa | 382/137 |

FOREIGN PATENT DOCUMENTS

WO    WO 01/43082    6/2001

* cited by examiner

*Primary Examiner*—Bot LeDynh
(74) *Attorney, Agent, or Firm*—Luis M. Ortiz; Kermit D. Lopez

(57) ABSTRACT

A device and method for validating a ticket having magnetic ink printed on at least one side of a ticket. The ink is magnetized to create a magnetic signal in the magnetic ink and thereafter a media reader sensor spaced from the ticket is used to verify the existence of a magnetic signal. The magnetic signal is comparable to pre-existing data to determine a match and/or validate tickets having a match. An optical reader can be used to obtain additional data stored in the form of bar codes or patterns on the printed magnetic ink. The optical signal is comparable to pre-existing data to determine a match and/or validate tickets having a match. Preferred comparators for magnetic and optical matching are microprocessors and preferred media reader sensors for magnetic readers are anisotropic magnetoresistive sensors.

10 Claims, 5 Drawing Sheets

MAGNETIC INK VALIDATION FOR COUPON AND GAMING INDUSTRIES

FIELD OF THE INVENTION

The present invention relates in general to a device for validating coupons, receipts and gaming tickets. More particularly, the present invention relates to sensing and reading magnetic ink in coupons, receipts and gaming tickets. The present invention also relates to a device in which a distinct and identifiable waveform, or logical pattern in magnetic ink is read from a coupon, receipt or gaming ticket by a sensor that may or may not be spaced from the ink by an air gap.

BACKGROUND

As service trends in retail and gaming industries go toward cashless payout systems, such as coupons, receipts and/or tickets, hereinafter collectively referred to as "tickets" additional security features will need to be incorporated with the tickets to insure validity of issued credits and prevent counterfeiting.

"TITO" refers to Ticket In, Ticket Out. That is the primary method of payout in most casinos today and especially Indian reservations. It is based on a bar code generated random number that is associated with the "payout", "credits", or "cashout" of a machine. The machine is networked to all the cashiers and pay stations to validate and make payment on winnings. After payment the ticket is voided.

Magnetic pattern sensors have been found to be suitable for differentiation of bank note types and patterns printed with magnetic ink. The typical applications include ATMs, cash counters, bill changers, ticket machines, automatic vending machines, card readers, and differentiation of E13B codes on gift certificates. The broad applications of magnetic ink detection includes "credit card readers, cash dispensers, security, access control, phone-card and personnel logging, Standard cassette fittings, record/Playback magnetic heads, Bank Note Verification, Professional Audio, and Film Stripes. By reading the magnetic stripes on credit and debit cards and driver's licenses—plus Magnetic Ink Character Recognition or MICR characters on checks, deposit and withdrawal slips, MICR readers speed transactions, eliminate manual entry errors and reduce fraud.

Financial institutions use MICR check readers and magnetic card readers to optimize interaction with customers and to improve cost efficiencies. Hospitality and Gaming organizations rely on MICR check readers and credit card readers to provide easy connectivity to PC-based applications. Creating a good magnetic ink reader is not without problems, however. The device is required to work with a large variety of bills from crisp new ones to ragged old ones, and it has to be reasonably good at telling real bills from counterfeit notes. In many cases the device also has to be able to sense the denomination of the bill. In order to accomplish the task, dollar bill changers use a variety of technologies. Many of the early bill changers took advantage of the fact that U.S. bills are printed with magnetic ink. By contrast, Euro bills are printed with magnetic material, which needs to be magnetized before sensing.

Magnetic heads (like the ones in a cassette tape recorder) are used to pick up signals from the bills. Areas of the bill would generate signals at a specific frequency and the detection of this frequency would validate the bill. The wave form or pattern is time and amplitude based. Both are dependent on the feed mechanism in relationship to the magnetic ink. Changing the speed of the feed mechanism will result in a waveform change. The various technologies for detecting the magnetic ink include Inductive heads and MR heads. The MR heads has got advanced features over inductive heads like high sensitivity and compact in size and good resolution. The detection of magnetic ink is a growing low-field magnetic sensor application. The use of iron oxide as a pigment in black ink has provided a method of reading and validating currency and other negotiable tickets. Additional magnetic features are being added to currency as PCs and excellent quality color printers have moved counterfeiting from the realm of the skilled engraver. One such application is reading the Magnetic Ink Character Recognition or MICR characters on the bottom of checks.

SUMMARY OF THE INVENTION

Features of the present embodiment are described through a method of validation using magnetic ink printed onto the coupon, ticket, or receipt, here forward to be designated as the "ticket". The present invention introduces a magnetic validation as well, or inclusive with the bar code as one more security feature to prevent counterfeiting etc. The methods can be applied to all lottery and betting parlors.

Because magnetic inks are readily available for applications such as check MICR printing and are also a vital security feature of many bank notes issued worldwide. By creating a magnetic pattern specific to an issuing location, such as a casino, or retail outlet, the ticket providers can create unique and independent signatures for their specific locations. Through the use of a magnetic ink validation sensor modules, or bill validator, and a microprocessor based computer algorithm, it is possible to program and validate a ticket either at the issuing device, or at a currency exchange/redemption window. Additional security features such as bar codes and coded entries at time of printing can be used to complement the validation process.

In accordance with an aspect of the embodiments, a ticket having at least a trace of magnitizable material is placed in the system in a predetermined pattern and a field is applied to magnetize the ink. The ticket is then "read" with a sensor capable of identifying the pattern. The read pattern is compared to a database of patterns that have been installed to identify the different tickets that are stored, and a decision is made as to whether the ticket pattern matches an approved pattern. In some embodiments, the device may be connected to other systems, such as recording payment, making change, crediting an account and the like. In accordance with features of this invention, a ticket is passed over the sensor at a small gap or distance so that the ticket does not directly contact the sensor. This permits tickets of varying thickness, age and condition, and other variables to be accepted without the danger of jamming, clogging or otherwise having the ticket disable the system. One critical advantage of using an air gap is that when the ticket is crumpled or folded, it may not be capable of being smoothed due to memory. Prior art devices are known to jam at some point beyond which it can not be reversed. The air gap of the present embodiment allows the reversal feature to be used at any point in the path of the ticket. To achieve this goal, sensitive low-field sensors such as an Anisotropic Magnetoresistive (AMR) sensor or a Giant Magnetoresistive (GMR) sensors are utilized with amplification and filtering.

The small size of AMR or GMR sensors offers the possibility of making closely spaced arrays of sensors to image a bill rather than just obtaining a signature on one line along or across the bill. Magnetic noise is common in the range of magnetic fields of interest to currency detection.

Care must be taken to minimize the presence of moving magnetic materials in the transport mechanism. Fields from adjacent electronics and motors must be reduced. Differential sensors with a second sensor two to three times further from the bill can also be used to minimize the effect of magnetic noise. The use of these sensors provides an opportunity to read the magnetized pattern at a distance. Preferred are devices where the gap is from about less than 0.25 mm to about more than 1.5 mm. Preferred are devices where the gap is from about 0.5 mm to about 1.0 mm. The gap should be sufficient to space the ticket from the sensor and avoid jamming and the like but not so distant as to prevent the sensor from reading the pattern.

In accordance with another feature, the device simply reads the pattern and directly compares the read pattern to the library of stored patterns, then makes a determination of whether or not the comparison shows an acceptable ticket or not. In another embodiment, a circuit is provided to determine if the magnetized signal also contains noise. The device may then compensate for the noise, in by use of a noise offset circuit. The signal is then read, amplified, and sent to the microprocessor to be compared to the data therein. When a ticket does not have the appropriate pattern for validation, it is rejected and the device is reset for the next ticket. The rejected ticket can either be discharged so as to return it to the user or the rejected ticket can be kept.

BRIEF DESCRIPTION OF THE DRAWINGS

For a more complete understanding of the invention, reference is hereby made to the drawings, in which:

FIG. 3 illustrates another block diagram of a system including magnetic and optical features in accordance with the embodiments;

In the figures, like reference characters designate identical or corresponding components and units throughout the several views.

DETAILED DESCRIPTION OF THE PREFERRED EMBODIMENT

Figure 1:
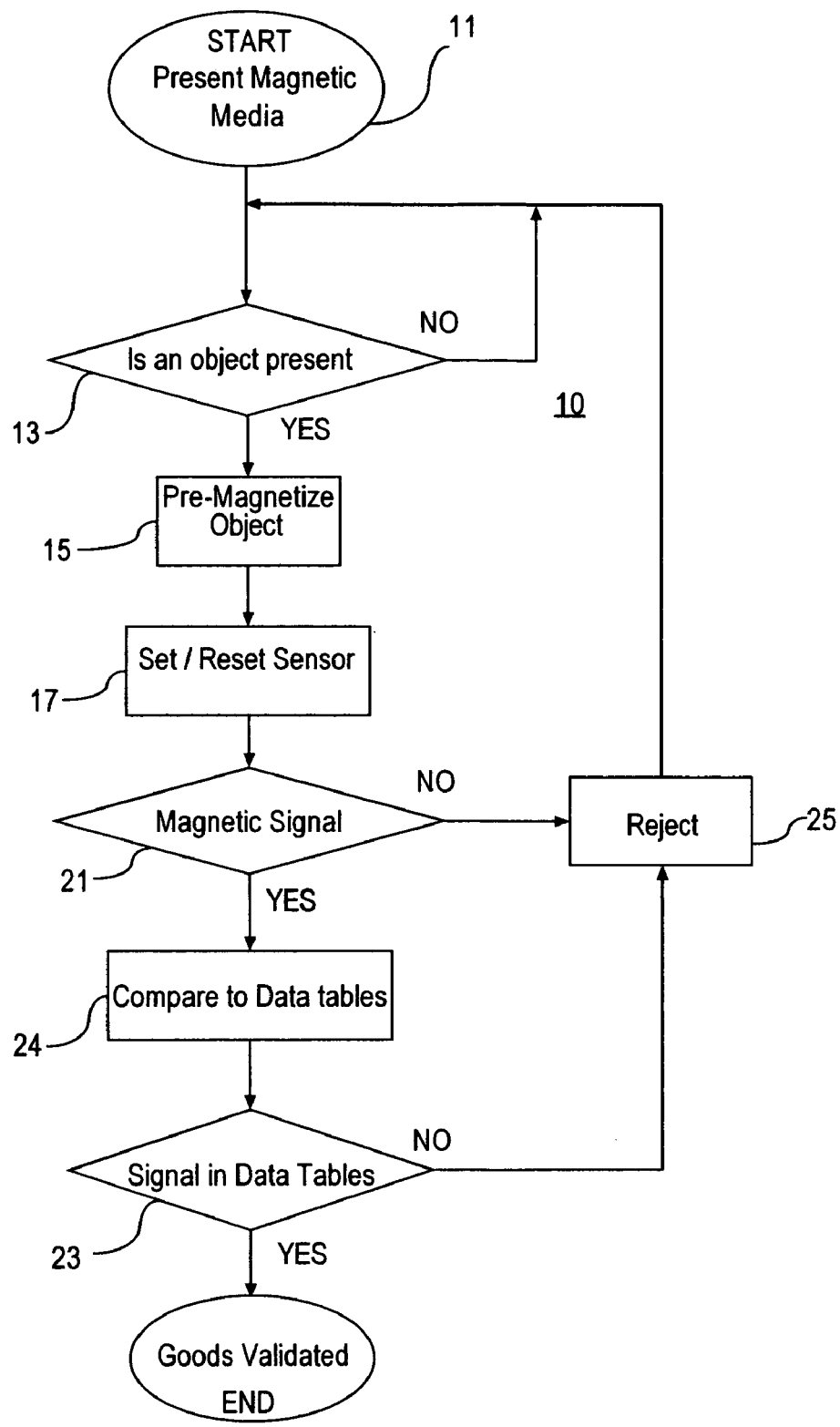
FIG. 1 is a flow diagram in accordance with the embodiments.

Referring to the figures, FIG. 1 shows the operational flow diagram 10 for a device, generally, where a ticket containing some ink or other material that can be magnetized, is inserted into a system at the start 11. An identifier signals the presence of such a ticket 13 and transfers it to a magnetizer station 15 where the iron oxide or other magnetizable material is subjected to a magnetic field and becomes magnetized. Since the ink is in a predetermined and unique pattern for each different ticket, it will contain a magnetized version of that pattern. For example, a unique serials number or bar code identifying a pay ticket from a machine in a casino.

Once the device magnetizes the ink, a sensor 17 is subjected to a set/reset function 19 to allow sensing of magnetic ink with greater sensitivity than previously attained. If a magnetic signal is detected by detector 21, the signal goes through a comparison step 24 wherein the signal is compared 24 by a comparator, usually a microprocessor, against data stored in memory or a database. If there is no signal at sensor (21) or if the signal from comparator (24) does not find a match through the comparator, the ticket is rejected 25 by a rejection device. The rejection device may return the ticket to the person attempting to have it verified or it can retain the ticket for later steps to be taken, depending on the nature of the ticket and the reason why it was rejected.

In another embodiment, if a ticket is rejected and the data comparison indicates that the ticket may be counterfeit, a photograph of the user may be taken or an alarm (silent or otherwise) may alert a security detail. If the ticket is accepted, a validation device completes the transaction 27, whatever that may be. AMR sensors are known and are available from electronics manufacturers.

In yet another aspect of the embodiments, a ticket having at least a trace of magnetizable material is placed in the system in a predetermined pattern and a field is applied to magnetize the ink. The ticket is then "read" with a sensor capable of identifying the pattern. The read pattern is captured to a database. A secondary optical scanning of the ticket is then performed. The scanned image is captured and associated to the magnetic pattern database. It should be appreciated that the following components can be included as part of a system, or provided as a stand alone unit. A microprocessor can be provided to receive comparative optical character recognition, (OCR) results from the optical image. These results would be archived in a storage retrieval system for future electronic transmittal or validation claims and inquiries, allowing the original ticket to be voided if so desired and further to the image capture. These results would be used to associate the magnetic pattern stored and validate with the OCR image. Double comparison can confirm the existence of a match between the signal(s) read from the magnetic ink formed on the ticket to the pre-existing data and that the image and data correlate to one and the same. Once validated, the image and magnetic data can be archived in a storage retrieval system for future electronic transmittal or validation claims and inquiries, allowing the original ticket to be voided if so desired. When a ticket does not have the appropriate matching pattern for validation, it is rejected and the device is reset for the next ticket. The rejected ticket can either be discharged so as to return it to the user or the rejected ticket can be kept.

Two preferred AMR sensors are manufactured by Honeywell International Inc. and sold under product designations HMC 1501 and HMC 1512. The HMC 1501 sensor contains one AMR bridge for a ±45° range of position sensing, and the HMC 1512 contains two AMR bridges for a ±90° range of position sensing. These sensors are fabricated with Permally (NiFe) thin films that create changes in resistivity with respect to external magnetic fields. These film materials are similar to magnetic recording tapes in that strong magnetic fields can disrupt the magnetic domains of the film particles from a smooth factory orientation to arbitrary directions. Accuracy and resolution of these sensors will suffer until the film magnetic domains are "reset" to recreate a uniform direction. This is overcome by use of a set and reset function for AMR sensors. Set or reset permits the sensor to recover from a strong external magnetic field that has re-magnetized the sensor or to optimize the magnetic domains for most sensitive performance. It is also used to flip the domains for extraction of bridge offset under changing temperature conditions. Commonly owned U.S. Pat. No. 6,717,403, the disclosure of which is fully incorporated herein by reference, describes a set and offset system that is a suitable design for the present invention. Honeywell International Inc. has three AMR sensor families that include set/reset straps and the characteristics are as follows:

TABLE I

HMC100X family: (per bridge)

Set/Reset Strap Resistance: 1.5 to 1.8 ohms
Set/Reset Strap Current: 3.0 to 5.0 amps
Set/Reset Strap Ohmic Tempco: 0.37%/° C. 15
HMC102X family: (per bridge)

Set/Reset Strap Resistance: 5.5 to 9.0 ohms
Set/Reset Strap Current: 0.5 to 4.0 amps
Set/Reset Strap Ohmic Tempco: 0.37%/° C. 20
HMC105X family: (per two bridged)

Set/Reset Strap Resistance: 3.0 o 5.0 ohms
Set/Reset Strap Current: 0.4 to 4.0 amps
Set/Reset Strap Ohmic Tempco: 0.37%/° C. 25

Magnetic noise is common in the range of magnetic fields of interest to document authentication and currency detection. Care must be taken to minimize the presence of moving magnetic materials in the transport mechanism. Field sensitivity from adjacent electronics and motors must be reduced or compensated for. By appropriately configuring the manufacture of the AMR elements, signal to noise ratios can be significantly reduced. Undesirable effects inherent in the sensor may interfere with magnetic field sensing such as bridge offset voltages and temperature effects. It is therefore desirable to perform automatic gain adjustment and real-time offset cancellation. By applying a strong magnetic field along the length of the sensor, performing the above described set/reset pulse, the alignment will always be maximized. Once aligned, the sensor will stay in that state for years unless a magnetic disturbing field is presented, which would be reason to again perform a set/reset pulse. The use of a set/reset pulse can also be used to reduce or eliminate offset voltage that may be caused if there is a resistor mismatch during manufacture.

Figure 2:
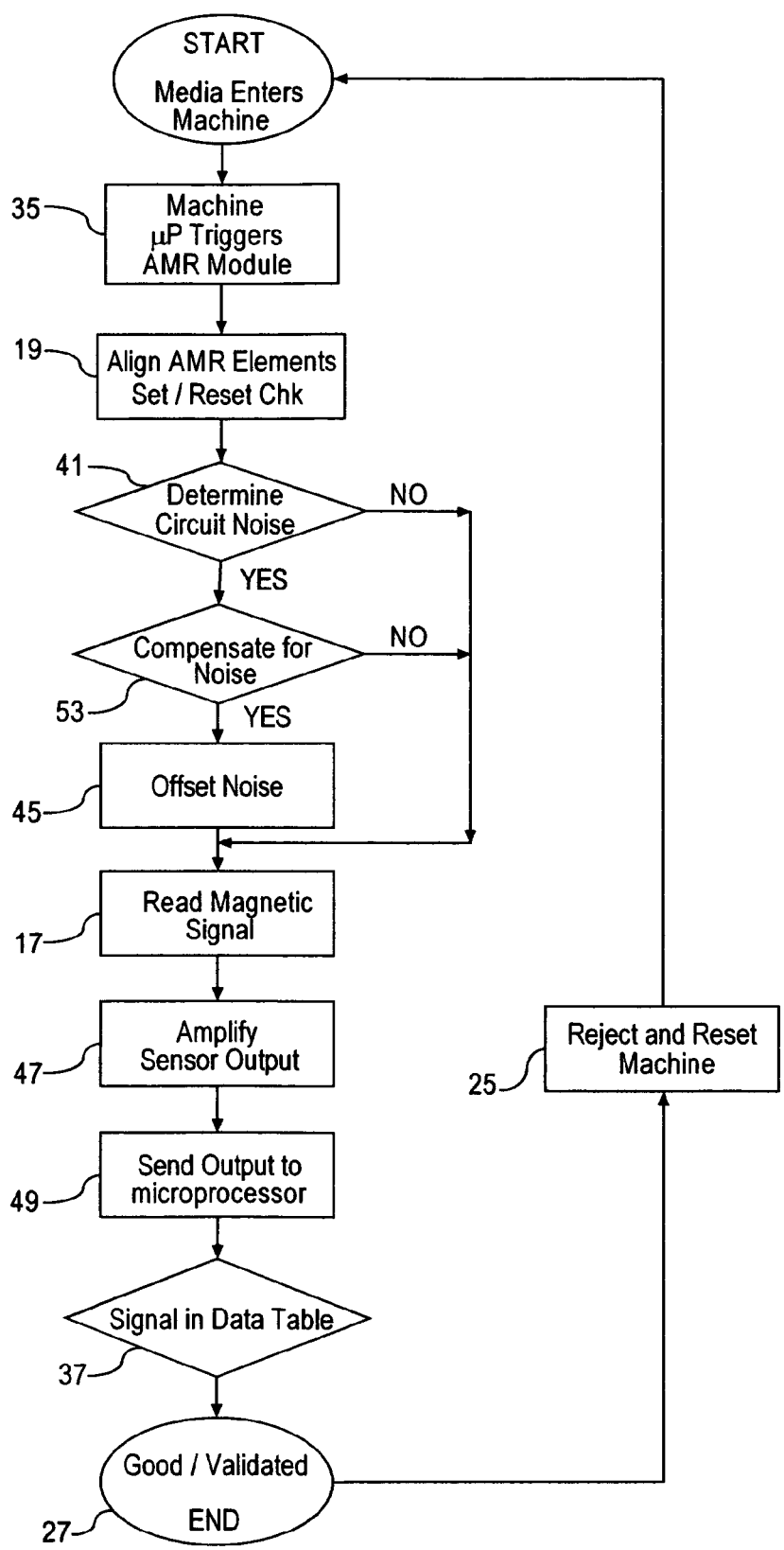
FIG. 2 is another flow diagram in accordance with the embodiments.

The present invention can be configured in a variety of ways. In the flow diagram of FIG. 2, a trigger is activated 35 by the microprocessor, and an alignment element aligns the ticket 19, subjects the sensor to a set/reset sensor. A circuit noise detector senses for noise 41, which can be by use a compensator 53 which in turn subjects the signal to an offset compensation 45 to eliminate the noise, or passes it directly to the sensor which reads the magnetic signal 17. The output of sensor is amplified by amplifier 47 and transmitted 49 to a microprocessor where the signal is compared to a data source 37 and either rejected 25 or validated 27.

Figure 3:
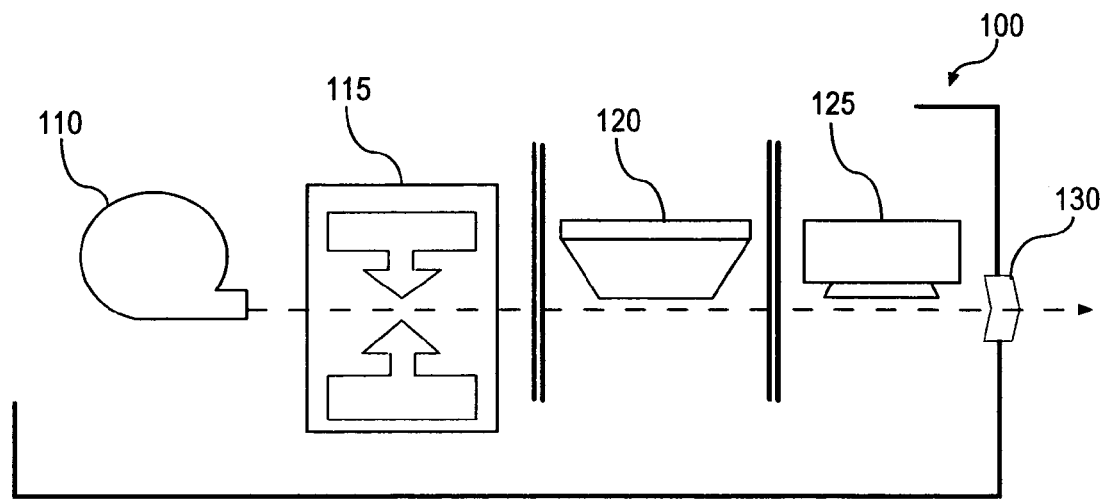
FIG. 3 illustrates a block diagram of a system including magnetic and optical features in accordance with the embodiments.

Referring to FIG. 3, a system 100 is shown for processing (e.g., creating) a ticket optically and magnetically in accordance with an embodiment. An internal ticket dispenser 110 stores blank tickets and presents them to a magnetic printer 115 adapted to print patterns and/or bar codes onto at least one side of a ticket using magnetic ink. A magnetic source 120 is provided to magnetize magnetic ink printed on the ticket, thus creating a unique signal. A magnetic signal reader 125 verifies the existence of the unique signal created by the magnetic ink printed on the ticket. An external ticket dispenser 130 is adapted to dispense a ticket to a user once processed. The ticket processing system described herein and its capabilities can be installed in/with casino gaming equipment.

Figure 4:
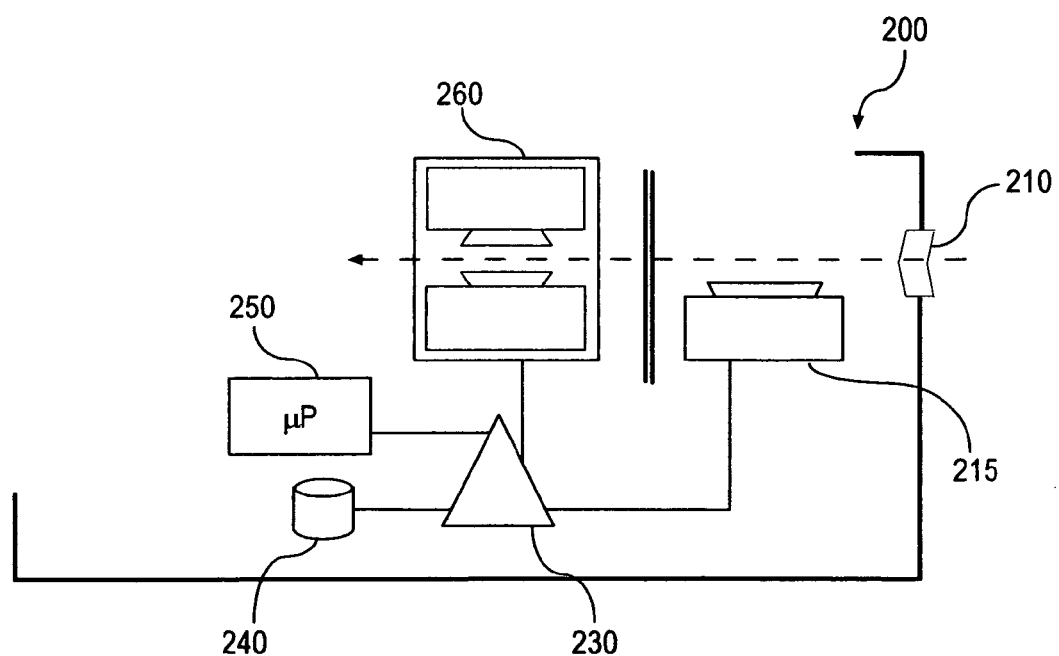
FIG. 4 illustrates a flow diagram of steps for processing a ticket optically and magnetically in accordance with the embodiment.

Referring to FIG. 4, components of a ticket validation and processing system 200 is shown. It should be appreciated that the following components can be included as part of system 100, or provided as a stand alone unit. An inlet 210 is provided in the system 200 for receiving from a user a ticket having magnetic ink printed thereon. A media reader sensor 215 is positioned to receive the ticket and read a signal previously created on the ticket by a magnetic source adapted to magnetize said magnetic ink and create a unique signal thereon. A comparator 230 can be adapted to receive the unique signal from the media reader sensor 215 and compare the unique signal to a set of pre-existing data stored in a database 240. A microprocessor 250 can be provided to receive comparative results from the comparator 230 and confirm the existence of a match between the signal(s) read from the magnetic ink formed on the ticket to the pre-existing data. The microprocessor 250 can be adapted to reject tickets that do not match any pre-existing data and validate tickets that have a match between the magnetic signal and pre-existing data. An optical reader 260 can be provided in the system for reading any optical signal (e.g., bar code or pattern) formed by the magnetic ink when the magnetic ink is printed on the ticket.

Figure 5:
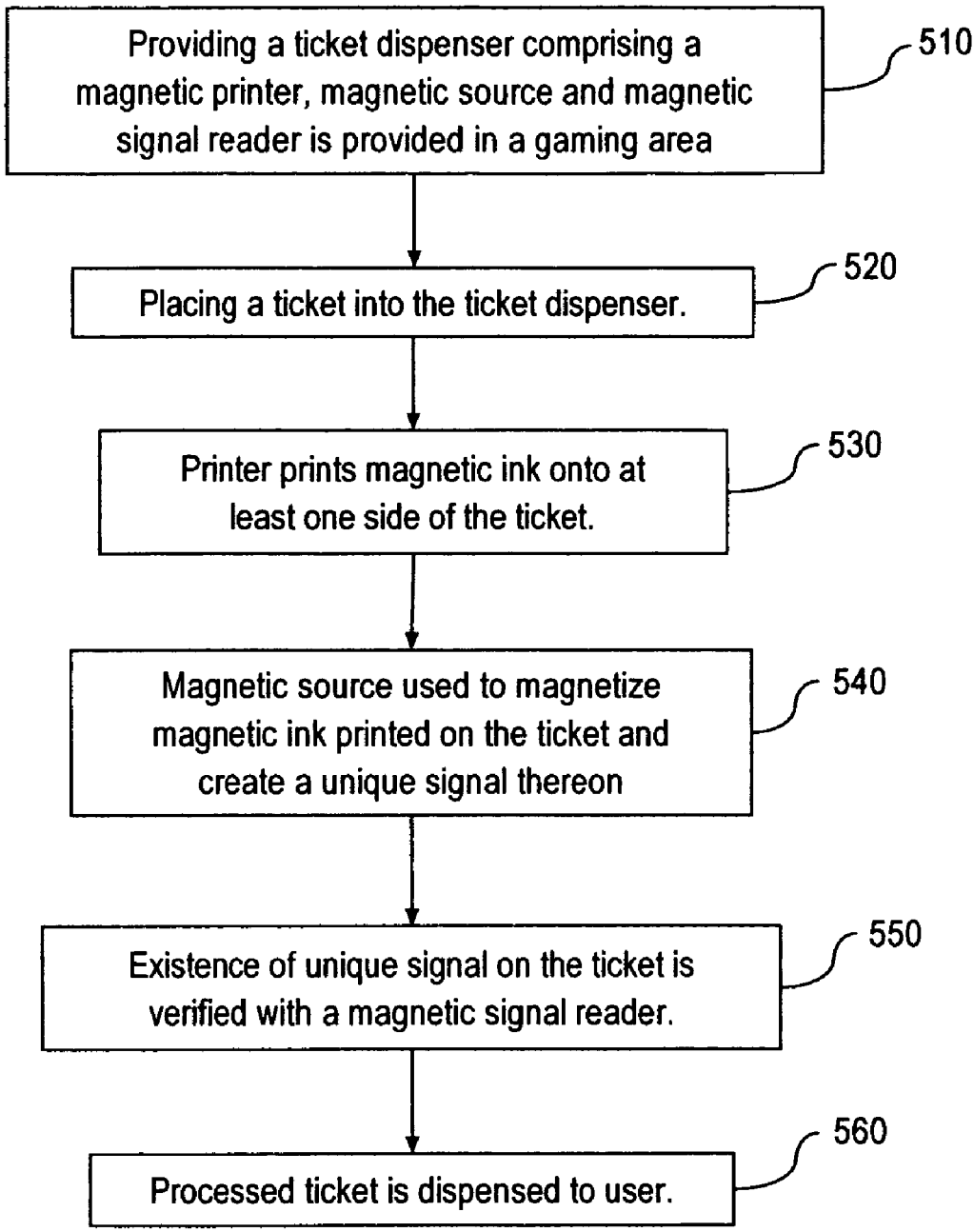
FIG. 5 illustrates another flow diagram of steps for creating a ticket optically and magnetically in accordance with the embodiment.

Referring to FIG. 5, a flow diagram 500 of a method in accordance with the ticket processing is shown. As shown at Step 510 a ticket dispenser comprising a magnetic printer, magnetic source and magnetic signal reader is provided in a gaming area. A ticket is placed into the ticket dispenser as shown in Step 520. Ticket placement is automated and can initially be placed in the printer for processing prior to issue to user, or placed through a slot into the system for validation (i.e., reading) and payment after initially being processed and dispensed to a user. During initial processing, the printer prints magnetic ink onto at least one side of the ticket as shown in Step 530. The magnetic ink is preferably printed in at least one of a pattern or bar code on at least one side of the ticket. As shown in Step 540, a magnetic source is used to magnetizing the magnetic ink printed on the ticket to create a unique signal thereon. As shown in Step 550, the existence of the unique signal on the ticket is verified with a magnetic signal reader. As shown in Step 560, the processed ticket is dispensed to a user.

Figure 6:
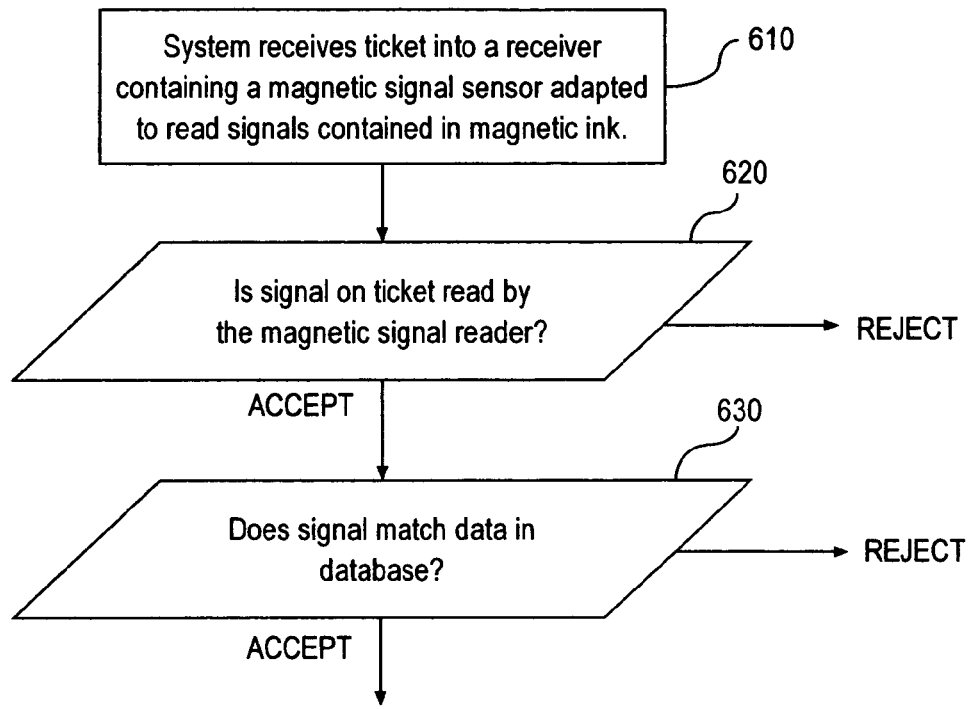
FIG. 6 illustrates another flow diagram of steps for processing a ticket optically and magnetically in accordance with the embodiment.

Referring to FIG. 6, validation of a ticket presented by a user to a ticket validation system begins at Step 610 where a system receives the ticket into a receiver containing a magnetic signal sensor adapted to read signals contained in magnetic ink. As shown in Step 620, a magnetic signal reader is used to verify the existence of a signal stored on the magnetic ink printed on the ticket. A ticket is rejected if a signal is not read by the magnetic signal reader or is accepted if a signal is read by the magnetic signal reader. As shown in Step 630, the signal read by the signal reader is then compared to data stored in a database. The ticket is rejected if the signal does not match data stored in the database or it is accepted (i.e., validated) if the signal matches data stored in the database.

Figure 7:
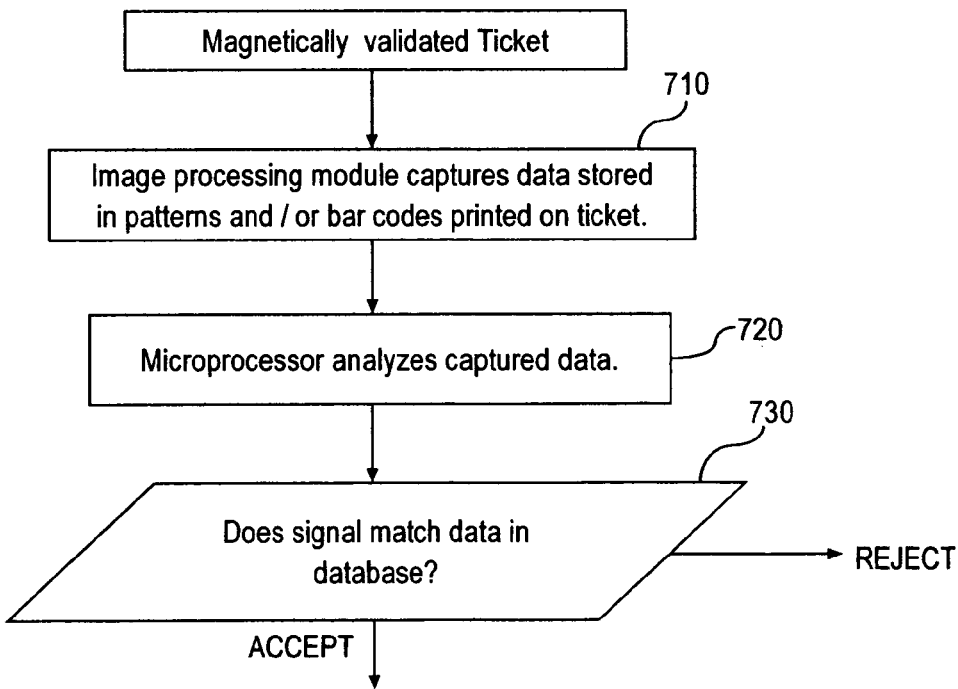
FIG. 7 illustrates another flow diagram of steps for processing a ticket optically and magnetically in accordance with the embodiment.

In addition to magnetic signal validation, a ticket can undergo further processing (e.g., validation, authentication, data retrieval) using optical means. As shown in FIG. 7, a ticket that has been validated for a magnetic signal can undergo optical processing using an image processing module with the ticket validation system. Beginning at step 710, an imaging processing module captures data stored in patterns and/or bar code printed on ticket. As shown in Step 720, the captured data in the form of patterns and/or bar codes printed on the ticket is processed/analyzed by a microprocessor for data. As shown in Step 730, the data is stored in memory. As shown in Step 740, the data can be rendered to at least one of a printer or monitor for processing by a pay clerk.

Using both magnetic and optical signal processing in conjunction with a gaming ticket, one should appreciate that a ticket or coupon used for purposes of payment in, for example, a casino setting can undergo stronger authentication/validation processing prior to payment of funds to a user/customer. For example, a ticket will be rejected if a signal is not read by the magnetic signal. Several combinations of processing steps can be used to verify, validate/authenticate a ticket prior to payment. For example, a system can reject a ticket if data that should be stored on it cannot be read by both the magnetic sensor and an optical reader. Also, a ticket can be accepted if at least one of the magnetic or optical readers can obtain valid data from the ticket. A ticket can also cause the system to notify security or management if problems are encountered during processing.

While particular embodiments of the present invention have been illustrated and described, they are merely exemplary and a person skilled in the art may make variations and modifications to the embodiments described herein without departing from the spirit and scope of the present invention. All such equivalent variations and modifications are intended to be included within the scope of this invention, and it is not intended to limit the invention, except as defined by the following claims.

What is claimed is:

1. A system for creating a ticket having magnetic ink printed thereon, comprising:
   an internal ticket dispenser adapted for storing blank tickets and for presenting blank tickets into a magnetic printer;
   a magnetic printer adapted to print patterns and/or bar codes onto at least one side of a ticket using magnetic ink; and
   magnetic source adapted to magnetize magnetic ink printed on the ticket to create a signal.

2. The system of claim 1, further comprising:
   a magnetic signal reader adapted for verifying the existence of the unique signal created on the magnetic ink printed on the ticket; and
   an external ticket dispenser to dispense a ticket to a user.

3. The system of claim 1, further comprising:
   a device for validating a ticket having magnetic ink printed thereon, comprising:
   an inlet for receiving a ticket having magnetic ink printed thereon;
   a media reader sensor positioned to receive said ticket and read a signal created on said ticket by a magnetic source adapted to magnetize said magnetic ink and create a unique signal thereon;
   a comparator adapted to receive the unique signal from said media reader sensor and compare the unique to a set of pre-existing data stored in a database; and
   a microprocessor positioned to receive comparative results from said comparator and confirm the existence of a match between the signal read from the magnetic ink formed on the ticket to pre-existing data, said microprocessor being adapted to reject tickets that do not match any pre-existing data and validate tickets that have a match between the magnetic signal and pre-existing data.

4. The system of claim 2, further comprising:
   a device for validating a ticket having magnetic ink printed thereon, comprising:
   an inlet for receiving a ticket having magnetic ink printed thereon;
   a media reader sensor positioned to receive said ticket and read a signal created on said ticket by a magnetic source adapted to magnetize said magnetic ink and create a unique signal thereon;
   a comparator adapted to receive the unique signal from said media reader sensor and compare the unique signal to a set of pre-existing data stored in a database; and
   a microprocessor positioned to receive comparative results from said comparator and confirm the existence of a match between the signal read from the magnetic ink formed on the ticket to pre-existing data, said microprocessor being adapted to reject tickets that do not match and pre-existing data and validate tickets that have a match between the magnetic signal and pre-existing data.

5. The system of claim 1 further comprising:
   a media reader sensor positioned to receive said ticket and read a signal created on said ticket by a magnetic source adapted to magnetize said magnetic ink and create a unique signal;
   a comparator adapted to receive the unique signal from said media reader sensor and compare the unique signal to a set of pre-existing data stored in a database; and
   a microprocessor positioned to receive comparative results from said comparator and confirm the existence of a match between the signal read from the magnetic ink formed on the ticket to pre-existing data, said microprocessor being adapted to reject tickets that do not match any pre-existing data and validates tickets that have a match between the magnetic signal and pre-existing data.

6. The system of claim 5, further comprising an optical reader for reading an optical signal stored in at least one of a bar code or pattern formed by the magnetic ink when the magnetic ink is printed on the ticket.

7. A method for creating, verifying and validating a ticket, said method comprising the steps of:
   providing a ticket dispenser comprising a magnetic printer, magnetic source and magnetic signal reader;
   placing a ticket into the ticket dispenser;
   using the printer to print magnetic ink onto at least one side of the ticket, said magnetic ink printed in at least one of a pattern or bar code;
   using the magnetic source to magnetizing the magnetic ink printed on the ticket to create a unique signal thereon;
   verifying the existence of the unique signal on the ticket with the magnetic signal reader; and
   dispensing the ticket to a user.

8. The method of claim 7 further comprising the steps of:
   beginning validation of a ticket presented by a user to a ticket validation system by receiving the ticket into a receiver containing a magnetic signal sensor adapted to read signals contained in magnetic ink;
   using the magnetic signal reader to verify the existence of a signal stored on the magnetic ink printed on the ticket;

rejecting the ticket if a signal is not read by the magnetic signal reader or if a signal is read by the magnetic signal reader, comprising the signal to data stored in a database; and rejecting the ticket if the signal does not match data stored in the database or validating the ticket if the signal matches data stored in the database.

9. The method of claim 8, further comprising the steps of:

providing an image processing module with the ticket validation system, said imaging processing module adapted to capture data stored in patterns and/or bar code printed on ticket;

capturing data stored in the patterns or bar codes printed on the ticket during ticket validation;

providing the captured data to a microprocessor where the data is analyzed;

storing the captured data in memory; and rendering the captured data to at least one of a printer or monitor for processing by a clerk.

10. The method of claim 8, further comprising the steps of:

providing an image processing module with the ticket validation system, said imaging processing module adapted to capture data stored in patterns and/or bar code printed on ticket;

capturing data stored in the patterns or bar codes printed on the ticket after ticket validation;

providing the captured data to a microprocessor where the data is analyzed;

storing the captured data in memory; and rendering the captured data to at least one of a printer or monitor for processing by a clerk.

* * * * *

UNITED STATES PATENT AND TRADEMARK OFFICE
CERTIFICATE OF CORRECTION

| | | |
|---|---|---|
| PATENT NO. | : 7,267,274 B2 | Page 1 of 1 |
| APPLICATION NO. | : 11/093908 | |
| DATED | : September 11, 2007 | |
| INVENTOR(S) | : Ronald J. Goetz | |

It is certified that error appears in the above-identified patent and that said Letters Patent is hereby corrected as shown below:

In Column 7, line 62, after "unique" insert --signal--.

Signed and Sealed this

Eighteenth Day of December, 2007

JON W. DUDAS
*Director of the United States Patent and Trademark Office*